(No Model.) 3 Sheets—Sheet 1.

H. A. TOBEY.
CABLE HEAD FOR ELECTRIC WIRES.

No. 586,463. Patented July 13, 1897.

Witnesses
Jos. H. Blackwood
Albert B. Blackwood

Inventor
Henry A. Tobey
by H. W. Doolittle & Son
Attorneys.

(No Model.) 3 Sheets—Sheet 2.

H. A. TOBEY.
CABLE HEAD FOR ELECTRIC WIRES.

No. 586,463. Patented July 13, 1897.

Witnesses
Jas. H. Blackwood
Albert B. Blackwood

Inventor
Henry A. Tobey
by
W. H. Doolittle & Son
Attorneys.

(No Model.) 3 Sheets—Sheet 3.

H. A. TOBEY.
CABLE HEAD FOR ELECTRIC WIRES.

No. 586,463. Patented July 13, 1897.

Witnesses
Jas. H. Blackwood
Albert B. Blackwood

Inventor
Henry A. Tobey
by M. H. Doolittle & Son
Attorneys.

UNITED STATES PATENT OFFICE.

HENRY ARCHIBALD TOBEY, OF TOLEDO, OHIO.

CABLE-HEAD FOR ELECTRIC WIRES.

SPECIFICATION forming part of Letters Patent No. 586,463, dated July 13, 1897.

Application filed January 14, 1897. Serial No. 619,187. (No model.)

*To all whom it may concern:*

Be it known that I, HENRY ARCHIBALD TOBEY, a citizen of the United States, residing at Toledo, in the county of Lucas and State of Ohio, have invented certain new and useful Improvements in Cable-Heads for Electric Wires; and I do hereby declare the following to be a full, clear, and exact description of the invention, such as will enable others skilled in the art to which it appertains to make and use the same.

My invention relates to cable-heads for electric wires, and has for its object to provide a cable-head of simple and cheap construction that will be air and water tight and yet readily accessible for change of wire connections, and also to provide means for any number of branch connections with the cable that may be required without the liability of exposing the cable or its connections to moisture.

To these ends my invention consists of the parts and combinations of parts, substantially as hereinafter described and claimed.

Figure 1:
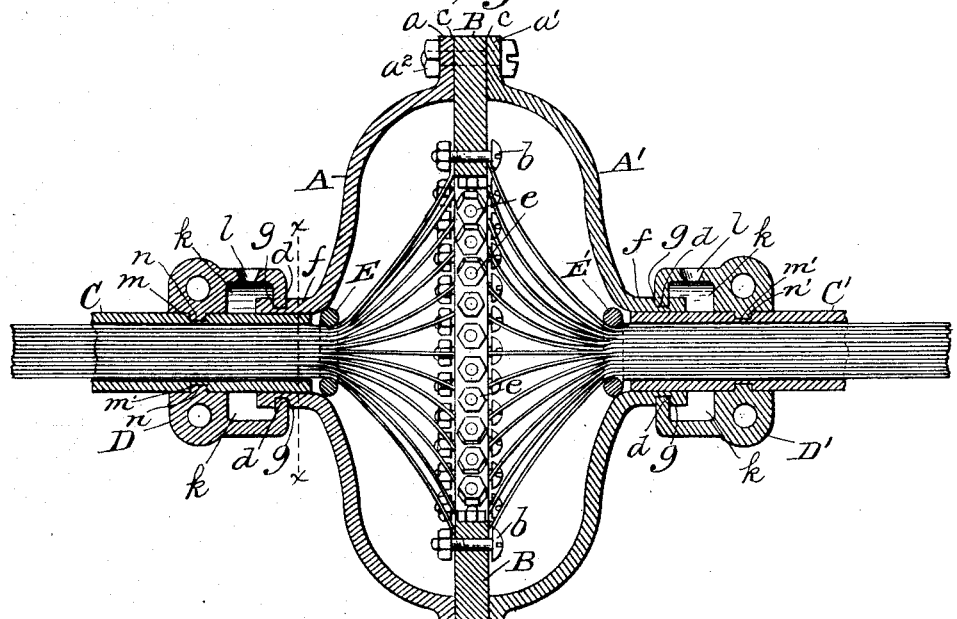
Figure 2:
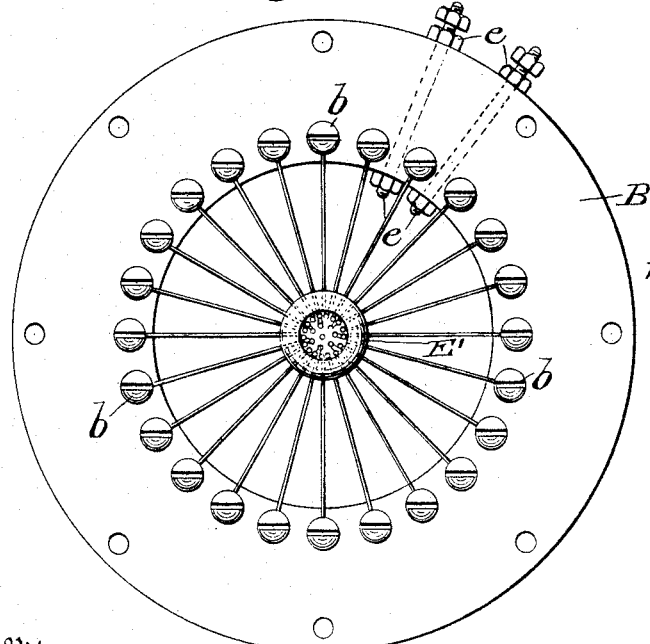
Figure 3:
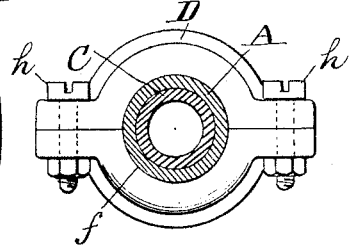
Figure 4:
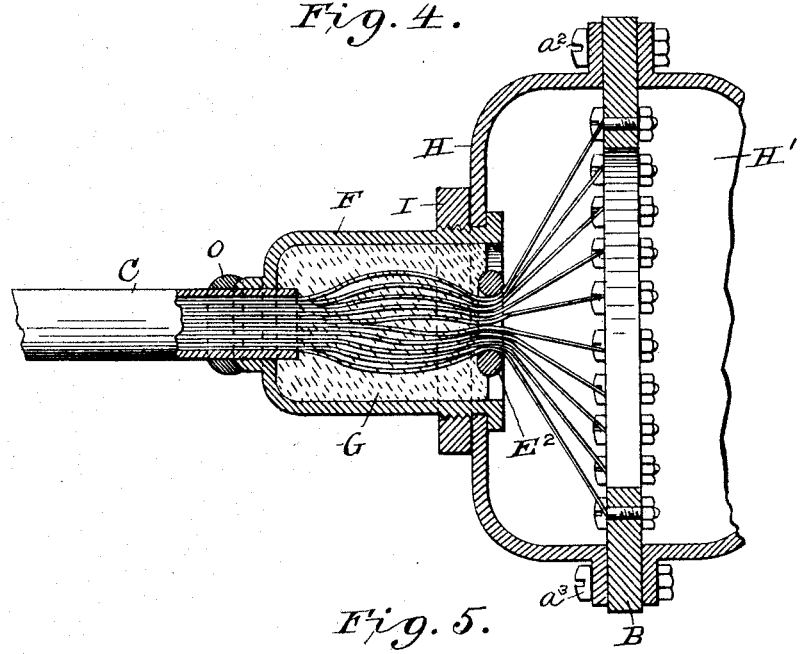
Figure 5:
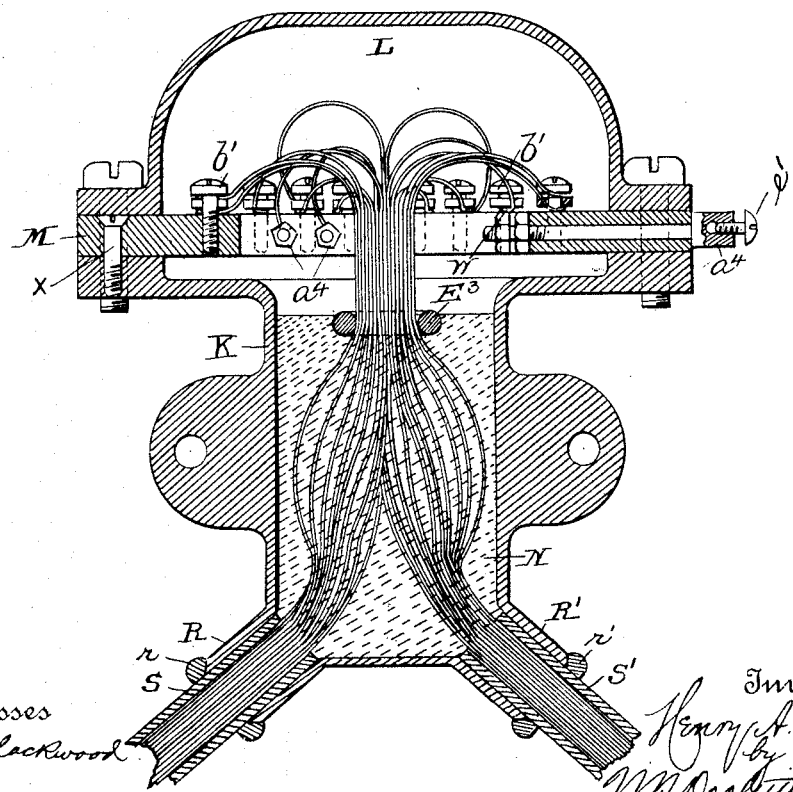
Figure 6:
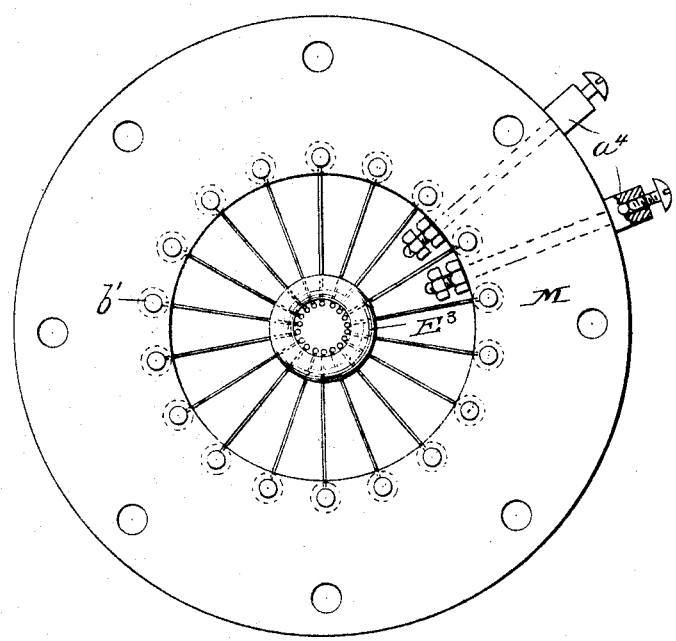
Figure 7:
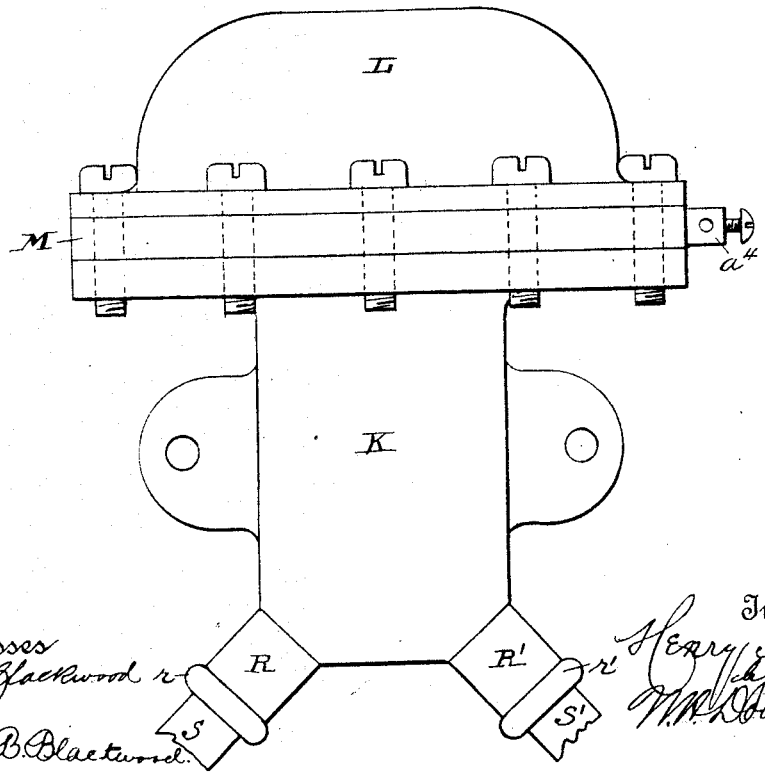

In the accompanying drawings, which illustrate my invention, Figure 1 is a longitudinal sectional view of my device; Fig. 2, a front view of disk constituting the connection-base; Fig. 3, a detail of clamp for cable and casement; Fig. 4, a view similar to Fig. 1, but partly broken away, of a modification of casement; Fig. 5, a longitudinal sectional view of another form of my device; Fig. 6, a detail view showing connection-disk used therein, and Fig. 7 a view in elevation of exterior of cable-head shown in Fig. 5.

Referring to the drawings, A A' are plates or shells of cast metal or other suitable material constituting the casement of the cable-head and having annular flanges $a$ $a'$, between which is firmly held an annular disk or washer B when the plates are clamped together by screw-bolts $a^2$ $a^3$ or other suitable means. The inner surfaces of the flanges $a$ $a'$ are faced with rubber or other packing material, or such faced surfaces may be provided on the disk B, which in either case forms a gasket with air and water tight joints $c$ $c$. Each casement plate or shell is provided at its center with a circular opening to admit the end of a section of lead-covered cable C C'. The plate around the opening is provided with a projecting lip $f$, in which is cut an annular groove $g$.

D and D' are clamps for securing shells A and A' to cable-sections C and C'. Each clamp is made in halves, held together by bolts or screws $h$. At its inner end the clamp has a lip $d$, which fits into groove $g$ on projection $f$. Back of this lip a space $k$ is formed between clamp D and the cable-covering, which is filled with paraffin or some similar substance through opening $l$, which seals the connection air-tight between plates A and A' and cable-sections C and C'. The opening in clamp D through which the cable end is admitted fits the lead covering of the cable neatly. There is a slight groove cut into the covering at $m$ and $m'$, into which ridges $n$ and $n'$ on clamp D fit neatly and closely, thereby securing firmly the cable to the clamp.

E and E', Fig. 1, are annular rings of gutta-percha or some non-conducting material through which the wires of the cable pass to prevent the covering of the wires where they are spread from coming in contact with the metal of the case or the lead covering of the cable.

The disk B, having a central opening, is provided near its inner circumference with binding-screws $b$ passing through said disk, to which the ends of the wires coming from the cable are secured to make the required connections. The disk is made of sufficient thickness to permit connection-studs or binding-screws $e$ to be passed through it edgewise from its outer to its inner circumference for the purpose of making branch connections. Any number of these studs may be employed, according to the number of branch connections desired.

A modification of the casement is shown in Fig. 4, which is to be used when the wires of the cable are insulated from each other by paper or any substance that might absorb moisture from the air contained in the space formed by the casement.

F is a sleeve which is soldered or otherwise fastened to the covering of cable C at $o$. In the sleeve F a chamber G is formed in which the ends of the paper-covered wires are connected with short pieces of rubber-covered wires which are brought out into the cable-head chamber through annular ring E², after which chamber G is filled with paraffin or some other molten non-conducting sealing substance and the wires connected on cable-head disk B, as before stated.

Plates H and H' are bolted together at their edges and embrace between them the annular disk B, which is of the same construction as that shown in Figs. 1 and 2.

I is a locking-nut on sleeve F to clamp together said sleeve and the plate or shell H.

To open the cable-head shown in Figs. 1 and 2, clamp D or D', or both, are first removed. Then the paraffin in space $k$ must be removed, and bolts $a^2$ $a^3$ are taken out, when plate A or A' will be free and slip back on the cable, allowing the wires and connection-screws to be reached and necessary changes in connections made.

In the modified form of head shown in Fig. 4 the nut I is first removed and then the bolts holding the casement-plates together are taken out, when the plates can be slipped back and the interior of the head will be exposed.

Fig. 5 shows a longitudinal section of another form of cable-head possessing the essential features of the one described, but with other features added which make this head preferable.

K, Fig. 5, is a hollow casting or box of suitable material forming the body of the device.

R R' are projecting nipples, through which the ends of sections of cable S and S' enter chamber N. Two admitting-nipples are shown, but it is obvious that more could be added, if desirable.

The opposite end of part K spreads out in a flange and at its edge makes a tight joint with the annular connection-disk M, (shown in detail in Fig. 6,) which is held firmly between the flange of box K and cap L, forming air-tight joints with said parts. The paper-covered ends of the cables are pushed up through chamber N, when annular disk M and cap L are removed and each wire connected with another piece of rubber-covered wire and the connections properly wrapped and tapped, after which the free ends of the rubber-covered wires are brought together and passed through gutta-percha ring E³. The cables are then retracted to the position shown in drawings and the nipples R R' soldered to the lead coverings of the cables at $r$ and $r'$, after which the chamber N is filled with paraffin or some other non-conductor in a molten condition, which effectually prevents the possibility of any moisture reaching the insulating-covering of the wires in the cables.

The ring E³ centers the wires in the chamber of the cable-head and provides a rounded surface for them to bend over instead of the sharp edge of the insulating and sealing material that has been poured into chamber N.

The free ends of the rubber-covered wires are brought up through the center of the annular disk M and connected with screws or binding-posts $b'$ around the circle. One screw or binding-post connects a wire from each cable entering the cable-head with a wire of the other cable or cables, a washer being placed between them. The under wire always indicates the cable from one direction, and the upper wire indicates the one entering from the other direction. Binding posts or studs $e'$ for branch wires are passed through the connection-disk M edgewise, the connections on the wires being made at $w$. It is obvious that any desired number of these posts may be added.

Small screws $x$ serve to hold disk M to the flange of box K when cap L is removed.

It will be seen that when cap L is taken off all the connections of the wires are on the face or outer surface of plate M. Therefore when it is desired to change the connection of any wire or wires all that is necessary is to unloosen a screw and carry the end of the wire around to the connection desired, and as all the wires radiate from the center the same length of wire is suitable for all connections. This arrangement does away with the necessity of bridging over from one connection to another with a piece of wire, as is the common practice, and any two wires may be connected by the same connecting post or screw. When the cap is returned to place and secured with bolts, the cable-head is both water and air tight.

From the foregoing description it will be seen that I have devised a cable-head the principal advantages of which consist in its small and convenient size, in a construction that will wholly exclude air, gas, and moisture, yet will be readily accessible for change of wire connections, and in having a connection plate or base provided with a central opening and with connection studs or screws having a common center, whereby the wires entering the cable-head will be equidistant from said connecting means and may be connected thereto without the intervention of separate wires for bridging over the connections.

Having thus described my invention, what I claim is—

1. A cable-head for electric wires, comprising in combination, a casement, a connection-plate therein, means for connecting the wires, said wires diverging radially to said means of connection and detachably connected on the plate, whereby each wire may be directly and readily connected with any other wire, substantially as described.

2. In a cable-head for electric wires, a casement, the annular disk secured in said casement for affording ready access for change in wire connections, said disk provided with means for connection of the wires, substantially as described.

3. In a cable-head for electric wires, a connection-plate therein consisting of an open disk of non-conducting material, connecting-screws arranged around the center thereof, and branch connection-screws extending through said disk from its outer to its inner edge, in combination with the wires entering said cable-head, substantially as described.

4. In combination with a cable-head having a casement, a non-conducting circular plate having a central opening secured in said casement, connection-screws passing from the exterior of said casement through said plate edgewise to the opening, and wires adapted to be connected to said screws, substantially as described.

5. In combination with a cable system of electric wires, a cable-head comprising shells forming a casement, openings in said casement for the admission of said cables, said openings provided with suitable sealing material, a connection-plate clamped between said shells, and means for hermetically sealing the junction formed by said shells and plate, substantially as described.

6. A cable-head casement provided with an opening to admit a section of lead-covered cable, connection means for the wires of said cable in the casement, in combination with a separate chamber through which said cable-section passes into the casement, said chamber filled around the cable with a non-conducting and sealing material, substantially as described.

7. A cable-head casement provided with an opening to admit a section of lead-covered cable, in combination with a separate chamber through which said cable-section passes into the casement, said chamber filled around the cable with a non-conducting and sealing material, and a ring of non-conducting material within said casement through which the wires of said cable pass, substantially as described.

8. A cable-head composed of a hollow box and cap united by an air-tight joint, in combination with an annular disk held in said joint, separate cables introduced into and united in said box, the cable-wires passed up through the central opening in said disk, the top surface of said disk provided with suitable binding-posts for making connections between the wires of said cables, substantially as described.

9. A cable-head box composed of a cap and a lower chamber, said chamber provided with projecting nipples, in combination with sections of cable passed through said nipples and chamber, said cap provided with outwardly-turned flanges corresponding with similar flanges on the chamber, a disk having a central opening and held between said cap and chamber flanges by an air-tight joint, a bearing-ring with a rounded surface at the head of said chamber through which the cable-wires are passed and by which they are centered, the wires from said cables passed through the central opening in said disk, and binding-posts on said disk to which the said wires are connected, substantially as described.

In testimony whereof I affix my signature in presence of two witnesses.

HENRY ARCHIBALD TOBEY.

Witnesses:
W. G. COOPER,
HARRY C. HAYS.